United States Patent [19]

Binnersley et al.

[11] Patent Number: 4,640,861

[45] Date of Patent: Feb. 3, 1987

[54] FIBER REINFORCED THERMOPLASTIC MATERIAL

[75] Inventors: Edwin K. Binnersley; William H. Krueger, both of Wilmington, Del.

[73] Assignee: E. I. Du Pont de Nemours and Company, Wilmington, Del.

[21] Appl. No.: 618,112

[22] Filed: Jun. 7, 1984

[51] Int. Cl.$^4$ .................................................. B32B 5/02
[52] U.S. Cl. ...................................... 428/294; 428/295
[58] Field of Search .............................. 428/294, 295

[56] References Cited

U.S. PATENT DOCUMENTS

| | | | |
|---|---|---|---|
| 3,253,073 | 5/1966 | Skobel | 264/174 |
| 3,323,941 | 6/1967 | Van Dijk | 118/420 |
| 3,388,025 | 6/1968 | Drica-Minieris et al. | 156/441 |
| 3,556,832 | 1/1971 | Park | 117/7 |
| 3,556,888 | 1/1971 | Goldsworthy | 156/73 |
| 3,914,499 | 10/1975 | Siefert | 428/292 |
| 3,993,726 | 11/1976 | Moyer | 264/174 |
| 4,132,756 | 1/1979 | Ferrentino et al. | 264/174 |
| 4,216,856 | 8/1980 | Moring et al. | 156/181 |
| 4,265,692 | 5/1981 | Stone et al. | 156/180 |
| 4,274,821 | 6/1981 | Kiemer | 264/172 |
| 4,325,322 | 4/1982 | Louch et al. | 118/410 |
| 4,329,750 | 5/1982 | Binnersley | 427/434.6 |

FOREIGN PATENT DOCUMENTS

| | | |
|---|---|---|
| 0056703 | 7/1982 | European Pat. Off. . |
| 2067612 | 7/1981 | United Kingdom . |
| 2083779 | 3/1982 | United Kingdom . |

OTHER PUBLICATIONS

"Structural Composites Find Big New Market: Jumbo Jetliners", A. Stuart Wood, *Modern Plastics*, Nov. 1981, pp. 57-59.

*Primary Examiner*—Marion C. McCamish

[57] ABSTRACT

A fiber reinforced material is made by passing a preheated tensioned filament array over an arcuate extruder head where thermoplastic polymer is flowed through the filament array to expel air from the array while coating the filaments with polymer. The filaments comprise 50 to 75 percent by volume of the material and the polymer has a relative viscosity of at least 50.

5 Claims, 8 Drawing Figures

FIBER REINFORCED THERMOPLASTIC MATERIAL

BACKGROUND OF THE INVENTION

This invention relates to fiber reinforced thermoplastic materials and to methods for producing such materials.

Fiber-reinforced plastic structures have been used for many years with increasing success because of their high strength, light weight and ease of fabrication compared to the wood or metal structures which they replace. Fibers such as glass, carbon and aramid are popular as reinforcement, and thermosetting resins such as polyester, phenolic and epoxy are common polymeric matrices.

Polymeric materials reinforced with continuous filaments are used as precursors for highly-stressed parts such as aerospace components requiring the highest possible strength with the lowest possible weight. Non-uniformity of the materials comprising such parts requires that the parts be over-constructed so that the weakest will surpass the service requirements. More uniform precursor materials would yield parts having less variation in properties and would permit constructing such parts more efficiently to design criteria.

The most important requirements are that each reinforcing fiber be coated on all surfaces by the polymeric matrix, that the matrix be free of voids and that the fibers be distributed as uniformly as possible throughout the matrix. Coating of the fibers has been accomplished in the past by using low-viscosity thermosetting materials or solutions of thermosetting or thermoplastic material, the low viscosity and surface tension aiding the penetration of the matrix materials through a bundle of reinforcing fibers so that substantially all fibers are completely coated. However, low viscosity materials have the drawback of exuding from the fibrous bundle and accumulating to form resin-rich areas, particularly when the fibers are under tension while drying or setting or when gravity acts on a horizontal bundle. Solution coating has the added drawback of leaving voids or resin-poor zones after the solvent evaporates. When groups of non-uniformly coated fibers are made into a test bar and stressed to failure, the failure tends to initiate at resin-rich zones or at voids.

Although thermosetting polymer matrices are widely used, they require a substantial time to harden under heat and pressure and so are not suitable for production of parts at high speeds. The fiber/matrix materials or so-called pre-preg materials must be refrigerated to extend their shelf life. Furthermore, incorrectly-formed parts or trimmed excess cannot be recovered and re-used.

Thermoplastic polymer matrices are potentially suitable for high-speed production of parts because they can be preheated to forming temperature and pressed only long enough to consolidate the materials and cool the matrix to a temperature at which the part may be removed from the mold without distorting. In addition, the cost of waste is greatly reduced because incorrectly-formed parts may be re-shaped, and scrap may be recovered and re-used.

However, thermoplastic matrices are quite difficult to apply uniformly to filament bundles. At temperatures above their melting points, such materials have high viscosity, and they degrade (decompose) rapidly if they are heated excessively in an attempt to lower the viscosity. Using low-viscosity thermoplastic polymer materials results in low-strength parts, whereas the highest possible matrix strength and toughness is usually desired. Such properties are characteristic of high molecular weight polymeric materials having long molecular chains and high melt viscosity.

According to one known technique for making fiber-reinforced thermoplastic polymer composites, a sheet of continuous parallel reinforcing filaments is placed between two thermoplastic films and heat and pressure is used to force melted thermoplastic between the filaments to completely coat all sides of the filaments. The thickness of the films is adjusted to provide the desired ratio of reinforcing filaments to matrix polymer. When a single spread layer of filaments is used, the goal can be accomplished reasonably well, but many layers are needed to make articles of practical thickness. When multiple layers of filaments are used to make a thicker array at a more reasonable cost, the pressure compacts the dry filaments, closing any gaps between them and preventing the thermoplastic polymeric material from penetrating to the center of the mass. The more layers of filaments are present, the more likely the center filaments are to have insufficient resin coating, and the surface layers are to be resin-rich. Thermoplastic resins have high coefficients of thermal expansion, shrinking as they cool, so that resin-rich zones result in residual thermal stresses and stress concentrations in a composite article that can initiate premature failure.

SUMMARY OF THE INVENTION

A precursor material for making fiber-reinforced structures with thermoplastic polymer matrix having more uniform distribution of reinforcing fibers in the polymer and smaller resin-rich zones than previously attainable has now been discovered comprising an array of continuous filaments arranged in two or more layers having thermoplastic polymer of 50 RV or greater on substantially all sides of the filaments to form a composite. The uniformity of distribution of filaments in the composite, as measured by the ratio of the mass mean length (L) between fiber bundles in the composite consolidation direction to the mass mean length between fiber bundles in the direction perpendicular thereto, said ratio is from about 0.5 to about 1.0 as determined by the test method described herein. The values of L in either direction being no greater than those shown in Table I.

TABLE I

| % Fiber | L |
|---------|-----|
| 50 | 25 |
| 55 | 20 |
| 60 | 15 |
| 65 | 10 |
| 70 | 6 |
| 75 | 3 |

The filaments comprise about 50 to 75% by volume of the composite material.

The composite material may be in ribbon-like form of a rectangular cross-section and may be of any desired width. It may be further assembled into greater widths by heat bonding multiple ribbons together and may likewise be increased in thickness by laminating multiple layers.

The fiber reinforced composite material is made by a process of passing a preheated tensioned fiber bundle array of continuous filaments in an arc in sliding contact with a heated extruder head having side walls and injecting thermoplastic polymer of 50 RV or greater into and through the array from a slot orifice transverse to one side of the array, expelling air from between the filament bundles, and forming random polymeric protrusions on the other side of the array, the bundles being free to move apart as the polymer travels between them while being restrained only by tension. The polymer extrusion rate, and the fiber bundle advance rate, are adjusted to provide a desired ratio of fiber bundles to polymer.

The heated extruder head arcuate surface preferably has a radius of 1.0 inch and the filaments are preferably in contact with the arcuate surface at least 5 degrees before passing over the slot orifice and at least 20 degrees after passing over the slot orifice.

The fiber bundles approaching the extruder head are preferably preheated to at least the melting point of the particular polymer being injected into the array.

The coated bundles of filaments may subsequently be passed under tension over one or more arcuate surfaces heated to or above the melting temperature of the polymer, at least the first of such surfaces preferably contacting the side of the coated bundles opposite to the side which was in contact with the arcuate surface of the extruder head. The coated bundles of filaments may be preheated before contacting such surfaces. The heat surfaces may preferably have side walls of similar dimensions to those of the extruder head and may have abrasion-resistant coatings similar to the extruder head.

The tension on the filament bundles as they pass over extrusion head is at least sufficient to maintain the bundles in close contact with the surface and with sides of the extrusion head to prevent leakage of polymer at sides and to force the polymer to flow between the bundles. Tensions of about 1.5 to 5.0 grams per denier are suitable, tensions in the lower end of this range being suitable for products using lower polymer RV and higher tensions for higher RV polymers. In general, products of low fiber loading require somewhat lower tensions than higher fiber loadings at a given polymer RV.

The product may be used directly in a filament-winding operation for making fiber reinforced pipe, pressure vessels and similar cylindrical or spherical objects by heating the material as it is wound to bond it to layers previously laid down. It may also be cut into lengths and placed in a mold to make objects similar to the test bar described herein. Other uses will be readily apparent.

Any continuous reinforcing filaments may be used, the only requirements being that the melting or softening point of the reinforcing filaments must exceed the temperature of the molten thermoplastic matrix and subsequent temperatures used for forming composite parts. Glass, carbon, graphite and aramid are examples of suitable filaments for use in this invention.

Whereas fiber reinforced composites of about 60-70% by volume of fiber can be made by other techniques, though with inferior uniformity, the present method is particularly suitable for making composites of 55% fiber or less. Low viscosity thermosetting materials or solutions are especially likely to run or be displaced from an ideal distribution in fibers when there is an excess of polymer. On the other hand, the high viscosity of the polymers of the present invention and the rapid cooling of the product after formation retain the good distribution of fibers in polymer which the present method produces even when the fiber loading is low.

One advantage of this impregnation method over others is that air trapped between reinforcing filament bundles is expelled ahead of the advancing polymer, avoiding this source of voids. An advantage of this method over pressure rolls is that pressure rolls can damage reinforcing fibers, especially brittle ones such as glass and carbon, and particularly when the fibers are not well parallelized and cross one another.

DETAILED DESCRIPTION OF THE PREFERRED EMBODIMENT

Figure 1:
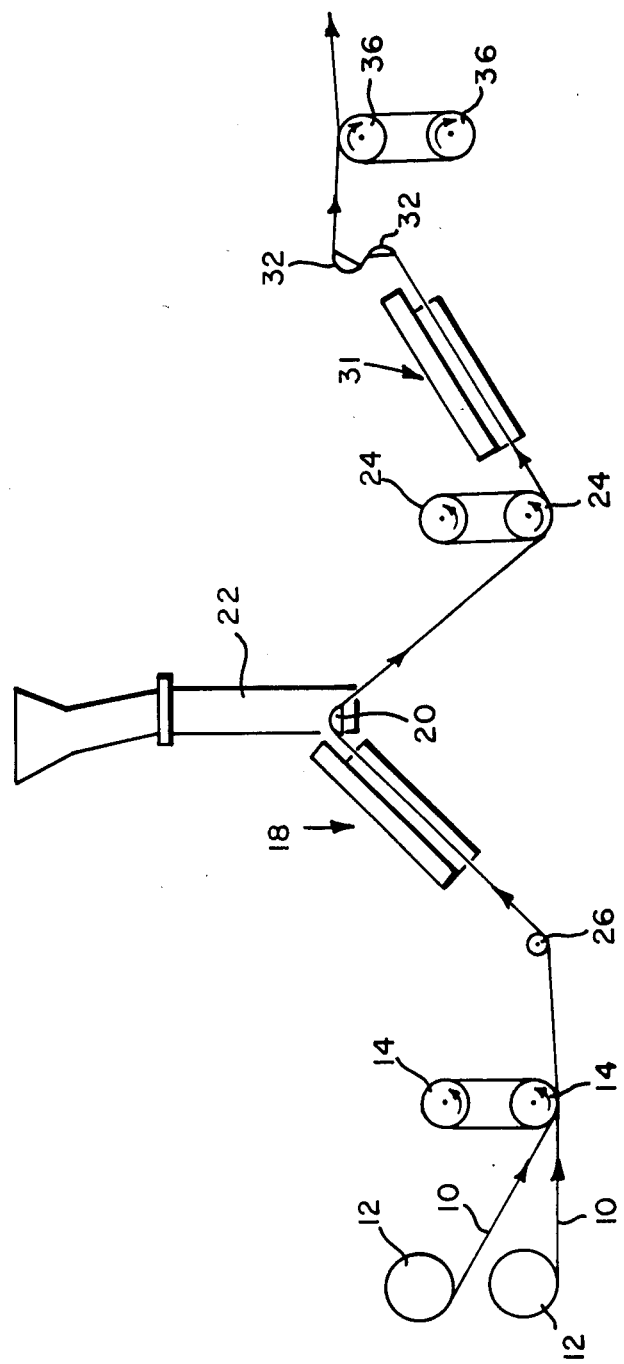
FIG. 1 shows schematically a process for preparing products of the invention.

Referring to FIG. 1, reinforcing filaments 10 are taken from packages 12 preferably by a rolling take-off to avoid inserting twist which would inhibit spreading of the filaments, the filaments are brought together at roll 14 and are led around driven rolls or suitable tension device 26. Heaters 18, which may be of any type but are preferably non-contacting, preheat filaments 10 to a temperature near that of the polymer which is supplied to extruder head 20 by extruder 22 at a rate correlated with the volume of filaments 10 passing the head 20 per unit time so as to give a desired fiber volume loading (volume of fiber as a percent of fiber plus polymer). Filaments 10 are tensioned as they are drawn over heated extruder head 20 by rolls 24. A spreading device 26 upstream of head 20 may be employed to spread the filaments evenly. Molten thermoplastic polymer is injected into the spread filaments at head 20, and the coated filaments after passing around rolls 24 are then passed through heaters 31 to re-heat product which has been coated at extruder head 20 and then is immediately passed over curved smoothing heads 32 which are heated by embedded resistance heating elements (not shown) to a temperature above the melting point of the polymer. The smoothing heads 32 preferably are shaped similarly to the extruder head 20 except that they have no slot orifice.

The coated filaments then pass over rolls 36 driven at a speed suitable for maintaining a desired tension at heads 30 and are then taken away to a windup or other device for further processing (not shown).

Figure 2A:
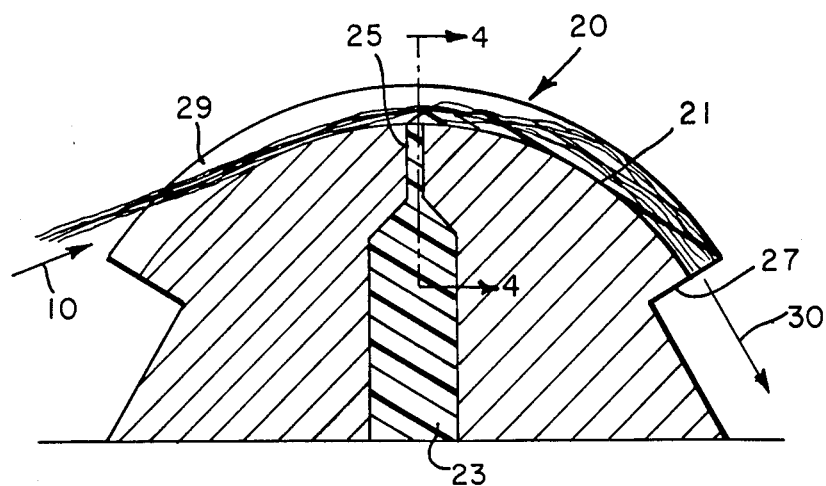
FIGS. 2a, 2b and 2c are enlarged views of a side elevation cross section of a heated extruder head a top view of its slot orifice and a cross section of its slot as used in FIG. 1.
Figure 2B:
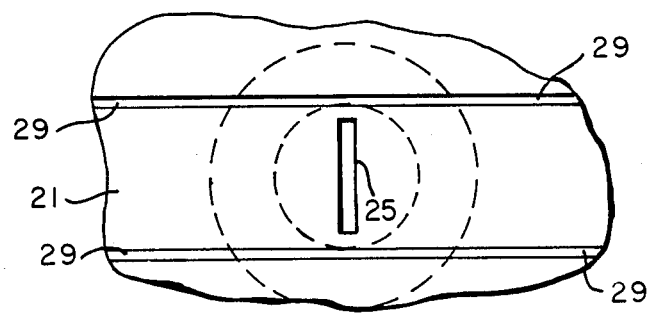
Figure 2C:
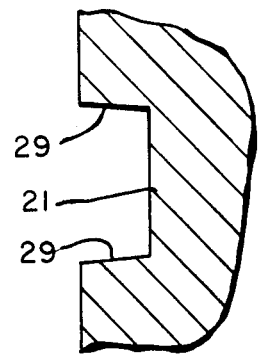
Figure 3:
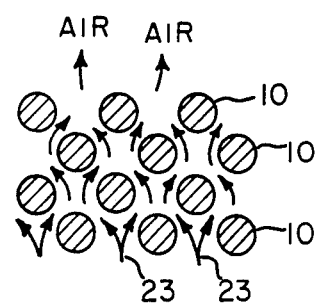
FIG. 3 is a schematic view of a typical flow pattern of thermoplastic polymer between the reinforcing filaments.

Referring to FIGS. 2a, 2b and 2c, tensioned and preheated filaments 10 which have been spread into two or more layers and a width of any desired dimension are drawn over arcuate surface 21 of extruder head 20 which is heated to a temperature above the melting point of the polymer to be employed. Polymer 23 is extruded through slot orifice 25 against an array of filaments 10 grouped in bundles which are restrained by tension, but are free to move apart as polymer 23 migrates between them as shown schematically in FIG. 3, thereby expelling air from between the filaments and reducing the resistance to flow of the polymer. Angle 27 between the exit end of head 20 and coated filaments 30 leaving the head is preferably 90° or more to insure that all polymer leaves head 20 with the coated filaments. Side walls 29 of extruder head 20 may be slightly angled as shown in FIG. 2c. Arcuate surface 21 and side walls 29 may preferably be coated with hard, abrasion-resistant materials such as titanium nitride or aluminum oxide or alternately the entire wearing surface may be made of a ceramic insert.

Figure 4:
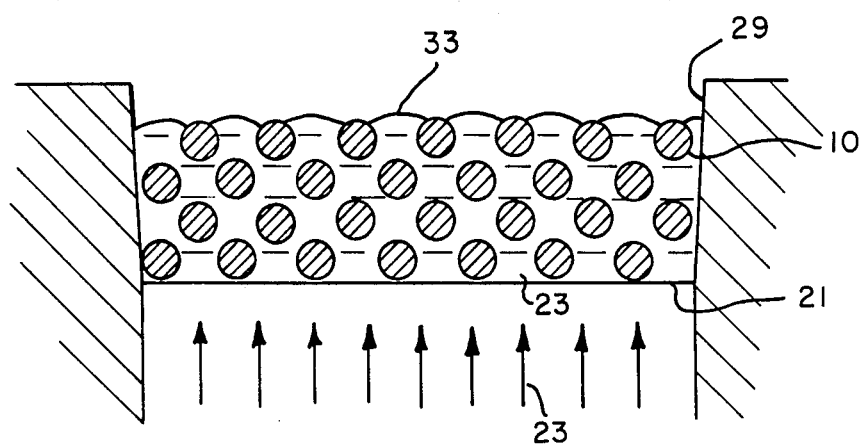
FIG. 4 is a schematic cross section view of the extruder head taken along line 4—4 of FIG. 2a showing the filaments coated with polymer.

In FIG. 4, the side of the product opposite to the direction of extrusion is shown enlarged. Polymer normally protrudes from side in scattered ridges or protrusions 33 which are elongated in a direction parallel to filaments 10 and are distributed in a widthwise direction. Some filaments between the ridges are not completely coated. The protrusions 33 also vary in size, but such variation may be minimized by improved uniformity in the arrangement of the filaments as they approach the extruder head. The position of such protrusions varies also along the length of the product. The amount of polymer in such protrusions is preferably the quantity needed to completely coat all filaments on this side of the product when polymer in the protrusions is re-distributed during molding of a composite part.

Protrusions 33 may be spread uniformly along surface by means such as the smoothing heads 32 shown in FIG. 1.

DESCRIPTION OF TESTS

The test described below for determining uniformity of fiber distribution involves the examination of sample photographs of cross sections transverse to fiber alignment at 40× magnification under a digital scanning microdensitometer (Model P1000 Photoscan manufactured by Optronics International, Chelmsford, Mass.).

UNIFORMITY OF FIBER DISTRIBUTION (Presence of Resin-Rich Areas)

Ultra-thin cross sections (about 25 microns in thickness) of the above test bars are prepared by a petrographic sectioning technique described in Costas, L. P., "The Use of Petrographic Thin Sectioning Techniques for Corrosion Studies", Microscope (1981) 29, 147–152. The cross section is then photographed at 40× magnification by transmitted light at four different locations, representing approximately 50% of the total cross-sectional area of the test bar. When carbon filaments are used, the filaments appear dark against a light (polymer) background.

A digital scanning microdensitometer, which measures the diffuse reflection density of picture points on a 12 cm × 12 cm photomicrograph, is used to determine presence of resin-rich areas. Each picture point is a 200 μm square, and the measurements are digitized to 1 part in 256. Each photomicrograph is scanned and the reflectivity measurements digitized onto a disk. A feature algorithm is used to process the data.

A threshold which falls between the transmission of light through the light and dark areas is selected so that the instrument registers "on" or "off" when scanning the respective areas. A square spot window is 200×200 microns. When scanning a 40× photograph of 8 micron fibers the relationship of the window to fibers is as the square 40 in FIG. 5 is to the circles 10 representing fibers or fiber bundles.

Figure 5:
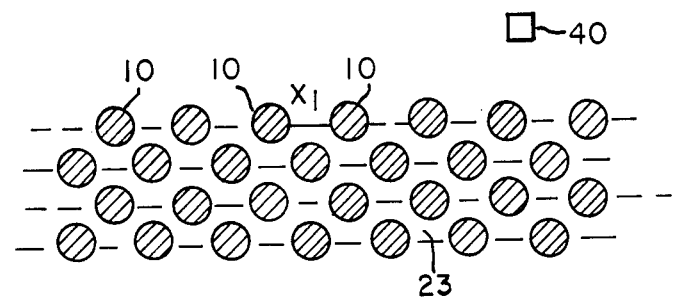
FIGS. 5 and 6 are illustrations showing the fiber distribution for the product of this invention.
Figure 6:
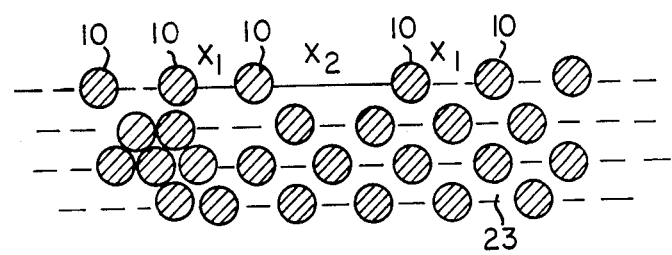

In FIG. 5, it can be seen that if all the circular fiber bundles 10 are equally spaced (i.e. ideal mixing), both the length of the scan line across each fiber bundle end and the length of the matrix background between fiber bundle ends $x_1$, would be short and similar in magnitude. As the mixing quality deviates further from excellent mixing, as illustrated in FIG. 6, the length of pulses across the fiber bundle ends is increased, but not as significantly as the background matrix scan length $x_2$. Therefore, a mass mean length between fiber bundles, "L" is calculated where $$L = \sum_i x_i^4 / \sum_i x_i^3$$

The values for $X_i$ are raised to the fourth power and divided by the sum of the same values to the third power to accentuate small differences in fiber distribution. The values are summed over the entire area of each of four photographs of representative areas of the specimen. Each photograph is scanned in two perpendicular directions, i.e., a composite consolidation direction (direction 1) and perpendicular thereto (direction 2) and a value of L is determined in each direction.

This is a measure of the frequency and extent of resin-rich areas in the composites. FIGS. 5 and 6 represent products of the present invention.

When light colored or translucent fibers are used either the fibers or the polymeric matrix may be stained a dark tone or a small amount of carbon black may be mixed into the polymer before extrusion to provide adequate contrast between the fibers and the matrix. If the matrix is dark, the scanner is set to detect distance between light areas, or a photographic negative may be scanned.

Relative Viscosity

A standard procedure for determining the relative viscosity of a polymer is described in the prior art; for example, in U.S. Pat. No. 3,511,815. The solvent used for the present determinations is a mixture of formic acid and phenol.

Preparation of Composite Specimens

Polymer-coated reinforcing filaments are cut to 5.9 inch lengths and a sufficient number of pieces to fill a mold 6.0×0.5 inches to a depth after consolidation of 0.125 inch for flex tests, 0.040 inch or 0.100 inch for compression tests are weighed and inserted in the mold parallel to the length. The mold is preheated to 295°–300° C., a plunger 6×0.5 inch is lowered into the mold, and the material is consolidated at a pressure of 850 psi for 30 minutes. The specimen is then removed from the mold, cooled, and, any excess polymer is trimmed off. Each specimen is measured and weighed to assess density and completeness of consolidation.

Ultimate Tensile Strength

Aluminum tabs 1.5×0.5 inch having a 30° end taper are bonded to each end of a specimen, leaving 3.0 inches between tabs. Tensile testing is performed at 0.05 inch/min. crosshead speed substantially as described in ASTM-D-3039.

Flexural Strength

Flexural strength is determined according to the test procedure of ASTM-D-790.

Interlaminar (Short Beam) Shear Strength

Interlaminar Shear Strength, also known as "Short Beam Shear" is measured according to the test procedure of ASTM-D-2344. A span-to-depth ratio of 4:1 is employed as well as loading at 3 points.

Compressive Strength

A test specimen is machined with the overall length being 3.18 to 3.19 inches, the width being 0.5 inch, the thickness being 0.10 inch. Grooves are machined at the center of the bar to give a reduced gage section, the lengthwise dimension being 0.188 inch and the thickness of the remaining material being 0.045±0.005 inch. The specimen is clamped and tested according to ASTM-D695.

EXAMPLE

Carbon yarn consisting of 3000 filaments of about 8 micron diameter each (3KAS4W Hercules Magmamite ®) is coated with thermoplastic polymer, a polycarbonamide from dodecane dioic acid and bis(para-aminocylohexyl)methane, as described in Speck U.S. Pat. No. 3,393,210 to form a composite material. The coating equipment is shown in FIGS. 1 and 2. Only one supply package of the carbon yarn is employed. The yarn comprises 50 to 75 percent by volume of the composite material.

The yarn is passed at 7.2 yards per minute over a contact heater to preheat the yarn to approximately 280° C., except that for sample 5 a radiant heater is used and the yarn speed is 15.2 ypm. Tension in the yarn approaching the extruder head is 3800 gms. and after the extruder head is 7300 gms. polymer flake is supplied to a vertical extruder with water cooled throat and nitrogen purged hopper where it is melted and supplied to the extruder head at a pressure of about 200 psi and temperature of 307°-320° C.

The extruder head has a radius of 1.00 inch, the arcuate surface has an included angle of 120°, and the width of surface 21 is 0.135 inches. Slot orifice 25 has a longitudinal dimension of 0.127 inch and a width of 0.040 inch.

Samples 1-6, are obtained from coated filaments that are cooled and wound on a package after leaving extruder head 20 without being reheated at heater 31 or passing over smoothing heads 32. These samples are made into composite specimens and tested, the occurrence of resin-rich areas being reported in Table II and physical properties appearing in Table III.

Coated filaments which have been processed as above are taken off a package and led through heater 31 and over two smoothing heads 32 in series, the tension before the smoothing heads being about 1000 gms and the tension after the smoothing heads being about 6000 gms. The temperature of the smoothing heads is 320° C. The smoothing heads have the same dimensions as the extruder heads, but do not have a slot orifice. This process is then repeated so that the coated filaments have passed twice over the two smoothing heads. Properties are reported under samples 7-10 in Tables II and III.

Resin-rich areas are likely to occur at the surfaces of coated filament bundles, and when these are consolidated in a mold, the resin-rich areas appear as striations or laminae predominantly perpendicular to the direction of pressing during consolidation. Other resin rich areas may be of irregular shape. Such areas shrink more than the ones having well-distributed filaments and act as stress concentrators where failure initiates. To detect such areas and to determine the overall distribution of resin-rich zones, the photographs are scanned in the composite consolidation direction (direction 1) and perpendicular to it (direction 2). A large value of L in either direction indicates resin-rich areas, and a large value of the ratio between L in the two directions indicates that the resin-rich areas are laminar in nature.

The flexural and short beam shear strengths of the composite specimens indicate freedom from large stress concentrations. The ultimate tensile strengths of the present specimens are equal or superior to composites employing thermosetting epoxy matrix. The compressive strengths are surprisingly high for a low-modulus thermoplastic matrix and indicate freedom from large stress concentrations.

TABLE II

| Sample | volume % Fiber[1] | $L^{(2)}$ Direction 1 | $L^{(2)}$ Direction 2 | Ratio L Direction 1 Direction 2 |
|---|---|---|---|---|
| 1 | 50 | 13.75 ± 2.6 | 20.9 ± 3.5 | 0.66 |
| 2 | 55 | 11.94 ± 2.1 | — | |
| 3 | 60 | 9.81 ± 2.8 | 11.63 ± 1.81 | 0.84 |
| 4 | 65 | 7.13 ± 1.6 | — | |
| 5 | 70 | 4.4 ± 1.3 | — | |
| 6 | 75 | 1.84 ± 0.1 | — | |
| 7 | 55 | 4.98 ± 0.41 | 9.5 ± 0.46 | 0.53 |
| 8 | 55 | 5.84 ± 0.72 | 8.81 ± 0.78 | 0.66 |
| 9 | 60 | 5.06 ± 1.41 | 9.62 ± 2.29 | 0.53 |
| 10 | 60 | 7.31 ± 1.37 | 12.89 ± 3.06 | 0.57 |

[1]Bulk Density Measurement.
[2]Weighted Mean Length Between Fiber Bundles; Fiber Diameter Units (i.e. 1 = 8μ).
Direction 1: Composite Consolidation Direction.
Direction 2: Perpendicular to Direction 1.

TABLE III

| Sample | volume % Fiber | Flexural Strength (KSI) | Short Beam Shear Strength (KSI) | Ultimate Tensile Strength (KSI) | Compressive Strength (KSI) |
|---|---|---|---|---|---|
| 1 | 50 | 152.9 | 12.9 | 260.4 | — |
| 2 | 55 | 146.6 | 12.8 | 308.7 | 156.0 |
| 3 | 60 | 144.2 | 12.9 | 354.0 | 150.0 |
| 4 | 65 | 162.0 | 12.5 | 355.4 | — |
| 5 | 70 | 165.6 | 10.5 | — | — |
| 6 | 75 | 184.1 | 12.1 | 364.7 | — |
| 7 | 55 | 162.8 | 11.8 | 310 | — |
| 8 | 55 | — | — | — | 120.0 |
| 9 | 60 | 168.3 | 11.8 | 331 | — |
| 10 | 60 | — | — | — | 125.0 |

We claim:

1. A fiber reinforced thermoplastic material comprising: an array of synthetic fiber bundles comprised of continuous filaments and a thermoplastic polymer coating substantially all sides of the filaments in the array to form a composite, said fiber bundles comprising from 50 to 60 percent by volume of said composite the uniformity of distribution of said filaments in said composite as measured by the ratio of the mass mean length (L) between fiber bundles in the composite consolidation direction to the mass mean length between fiber bundles in the direction perpendicular thereto, said ratio being from about 0.5 to about 1.0.

2. A fiber reinforced thermoplastic material comprising: an array of synthetic fiber bundles comprised of continuous filaments and a thermoplastic polymer coating substantially all sides of the filaments in the array to form a composite, said fiber bundles comprising from 50 to 75 percent by volume of said composite, the uniformity of distribution of said filaments in said composite as measured by the ratio of the mass mean length (L) between fiber bundles in the composite consolidation direction to the mass mean length between fiber bundles in the direction perpendicular thereto, said ratio being from about 0.5 to about 1.0, the values of (L) in either direction being no greater than those in Table I.

3. The material of claim 1 or claim 2, said thermoplastic polymer having a relative viscosity of at least 50.

4. The material of claim 1 or claim 2, said synthetic filaments being carbon said thermoplastic polymer being a polycarbonamide from dodecane dioic acid and bis(para-aminocylohexyl)methane.

5. The material of claim 1 or claim 2, said composite material having a rectangular cross section.

* * * * *